United States Patent
Stanich et al.

(10) Patent No.: US 9,785,873 B2
(45) Date of Patent: Oct. 10, 2017

(54) HALFTONE CALIBRATION MECHANISM

(71) Applicants: Mikel Stanich, Longmont, CO (US); Nikita Gurudath, Boulder, CO (US); Larry M. Ernst, Longmont, CO (US); William E. Manchester, Erie, CO (US)

(72) Inventors: Mikel Stanich, Longmont, CO (US); Nikita Gurudath, Boulder, CO (US); Larry M. Ernst, Longmont, CO (US); William E. Manchester, Erie, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/044,355

(22) Filed: Feb. 16, 2016

(65) Prior Publication Data
US 2017/0236041 A1     Aug. 17, 2017

(51) Int. Cl.
| H04N 1/46 | (2006.01) |
| H04N 1/60 | (2006.01) |
| G03F 3/08 | (2006.01) |
| G01D 18/00 | (2006.01) |
| G06K 15/02 | (2006.01) |

(52) U.S. Cl.
CPC ................ *G06K 15/1881* (2013.01)

(58) Field of Classification Search
None
See application file for complete search history.

(56) References Cited

U.S. PATENT DOCUMENTS

| 5,170,257 | A | * | 12/1992 | Burns | B41B 27/00 358/3.21 |
| 5,245,443 | A | * | 9/1993 | Burns | B41B 27/00 358/3.21 |
| 5,296,935 | A | * | 3/1994 | Bresler | G06F 17/15 358/406 |
| 5,457,541 | A | | 10/1995 | Burns | |
| 5,568,572 | A | | 10/1996 | Shu | |
| 5,898,820 | A | | 4/1999 | Borg et al. | |
| 5,978,506 | A | * | 11/1999 | Murayama | H04N 1/6033 358/517 |
| 6,055,071 | A | * | 4/2000 | Kuwata | H04N 1/6033 358/501 |

(Continued)

FOREIGN PATENT DOCUMENTS

| EP | 0741488 A2 | 11/1996 |
| JP | 2003118133 | 4/2003 |
| WO | 93-17867 | 9/1993 |

OTHER PUBLICATIONS

Vrhel, M.J., et al., "Color Device Calibration: A Mathematical Formulation", IEEE Transactions on Image Processing, 8(12), (Dec. 1999), 1796-1806.

(Continued)

*Primary Examiner* — Madelein Nguyen
(74) *Attorney, Agent, or Firm* — Alpine Technology Law Group LLC

(57) ABSTRACT

A printing system is disclosed. The printing system includes a halftone calibration module to receive one or more un-calibrated halftones, transform un-calibrated threshold values in the one or more un-calibrated halftones via an inverse transfer function to generate calibrated halftone threshold values and generate one or more calibrated halftones based on the calibrated halftone threshold values.

20 Claims, 9 Drawing Sheets

(56) References Cited

U.S. PATENT DOCUMENTS

| | | | |
|---|---|---|---|
| 6,181,445 B1* | 1/2001 | Lin | H04N 1/6058 358/504 |
| 6,185,004 B1* | 2/2001 | Lin | H04N 1/6033 358/1.9 |
| 6,185,007 B1* | 2/2001 | Hayashi | H04N 1/6033 358/1.9 |
| 6,191,867 B1 | 2/2001 | Shor et al. | |
| 6,418,281 B1* | 7/2002 | Ohki | G03G 15/5062 358/300 |
| 6,459,825 B1* | 10/2002 | Lippincott | H04N 1/00005 358/504 |
| 6,462,835 B1* | 10/2002 | Loushin | G06T 5/009 358/1.9 |
| 6,463,227 B1* | 10/2002 | Denton | G03G 15/5058 347/131 |
| 6,554,388 B1 | 4/2003 | Wong et al. | |
| 6,633,408 B1* | 10/2003 | Rozzi | H04N 1/603 358/1.9 |
| 6,766,263 B1* | 7/2004 | Stokes | H04N 1/6027 348/E9.01 |
| 6,825,944 B1* | 11/2004 | Noda | G06F 3/1284 358/1.15 |
| 7,139,087 B2* | 11/2006 | Hayashi | H04N 1/32502 358/1.15 |
| 7,190,490 B2 | 3/2007 | Cooper et al. | |
| 7,304,482 B1* | 12/2007 | Kay | G09G 3/006 324/615 |
| 7,321,448 B2 | 1/2008 | Nishida et al. | |
| 7,424,169 B2 | 9/2008 | Viassolo et al. | |
| 7,545,536 B2* | 6/2009 | Hayashi | H04N 1/6033 345/589 |
| 7,626,614 B1* | 12/2009 | Marcu | H04N 5/2353 348/222.1 |
| 7,692,832 B2* | 4/2010 | Klassen | H04N 1/00002 358/1.9 |
| 7,729,015 B2 | 6/2010 | Mizes et al. | |
| 7,791,760 B2 | 9/2010 | Shimada | |
| 7,798,588 B2 | 9/2010 | Arazaki | |
| 8,179,576 B2* | 5/2012 | Hayashi | H04N 1/6033 358/1.9 |
| 8,189,243 B1* | 5/2012 | Borg | H04N 1/6033 358/1.9 |
| 8,322,811 B2 | 12/2012 | Chandu et al. | |
| 8,368,978 B2* | 2/2013 | Qiao | H04N 1/6022 358/1.9 |
| 8,395,831 B2* | 3/2013 | Qiao | H04N 1/6022 358/1.9 |
| 8,542,418 B2 | 9/2013 | Chandu et al. | |
| 8,559,061 B2 | 10/2013 | Kuo et al. | |
| 8,681,379 B2* | 3/2014 | Nakamura | H04N 1/6055 358/1.15 |
| 8,817,329 B2* | 8/2014 | Satoh | G01J 3/462 358/1.9 |
| 2002/0113984 A1* | 8/2002 | Nakajima | H04N 1/6033 358/1.9 |
| 2003/0048464 A1 | 3/2003 | Yamada et al. | |
| 2003/0048478 A1* | 3/2003 | Cheng | H04N 1/4078 358/3.06 |
| 2003/0058460 A1* | 3/2003 | Denton | G03G 15/5058 358/1.9 |
| 2003/0128378 A1 | 7/2003 | Cooper et al. | |
| 2003/0164960 A1 | 9/2003 | Housel | |
| 2003/0231785 A1* | 12/2003 | Rhoads | G06F 17/30876 382/100 |
| 2003/0234946 A1* | 12/2003 | Saito | H04N 1/60 358/1.9 |
| 2004/0002023 A1* | 1/2004 | Sowinski | G03C 7/3041 430/505 |
| 2004/0145758 A1 | 7/2004 | Lamy et al. | |
| 2004/0150844 A1* | 8/2004 | Sanger | H04N 1/407 358/1.9 |
| 2004/0190092 A1* | 9/2004 | Silverbrook | G06F 3/03545 358/539 |
| 2004/0263911 A1* | 12/2004 | Rodriguez | B42D 25/29 358/3.28 |
| 2006/0012809 A1 | 1/2006 | Shimada | |
| 2007/0053003 A1* | 3/2007 | Loce | H04N 1/60 358/3.06 |
| 2007/0223064 A1* | 9/2007 | Ichitani | H04N 1/6033 358/504 |
| 2009/0002530 A1* | 1/2009 | Arai | H04N 5/217 348/294 |
| 2009/0189928 A1 | 7/2009 | Ino et al. | |
| 2010/0110461 A1 | 5/2010 | Hallam | |
| 2010/0245620 A1* | 9/2010 | Arai | H04N 5/35563 348/229.1 |
| 2010/0245867 A1 | 9/2010 | Murata | |
| 2011/0013210 A1 | 1/2011 | Yamaguchi | |
| 2011/0148968 A1* | 6/2011 | Chandu | B41J 2/2052 347/15 |
| 2011/0211008 A1 | 9/2011 | Teshigawara et al. | |
| 2011/0235060 A1 | 9/2011 | Tai et al. | |
| 2011/0292417 A1* | 12/2011 | Miyagi | H04N 1/6033 358/1.9 |
| 2012/0081436 A1* | 4/2012 | Yamada | B41J 2/2139 347/14 |
| 2012/0133962 A1* | 5/2012 | Kondo | H04N 1/6033 358/1.9 |
| 2012/0147389 A1* | 6/2012 | Ishihara | G06K 15/1809 358/1.2 |
| 2013/0063740 A1* | 3/2013 | Mochizuki | G03G 15/6585 358/1.9 |
| 2013/0063785 A1* | 3/2013 | Miyazaki | G03G 15/502 358/2.1 |
| 2013/0176600 A1 | 7/2013 | Chandu et al. | |
| 2013/0250312 A1* | 9/2013 | Miyazaki | G03G 15/01 358/1.1 |
| 2014/0029020 A1* | 1/2014 | Murakata | G03G 15/556 358/1.1 |
| 2014/0071497 A1 | 3/2014 | Kuno | |
| 2014/0111832 A1* | 4/2014 | Hayashi | H04N 1/4078 358/3.06 |
| 2015/0015923 A1* | 1/2015 | Hayashi | H04N 1/6033 358/474 |
| 2016/0044207 A1* | 2/2016 | Kobayashi | H04N 1/4078 358/2.1 |
| 2016/0100079 A1 | 4/2016 | Gerrits et al. | |

OTHER PUBLICATIONS

Vantram, et al., "Fully Automated Calibration Procedure to Compensate Print Non-Uniformities Incurred in Fixed Print-Head Array Structures", Ricoh Technical Report No. 39, Jan. 2014, pp. 154-160.

Vantram et al., Fully Automated Calibration Procedure to Compensate Print Non-Uniformities Incurred in Fixed Print-Head Array Structures, Jan. 2014, pp. 1-7.

Anonymous, "Halftone Definition", XP055380937, Retrieved from: https://techterms.com/definition/halftone, retrieved on Jun. 13, 2017.

EP Search Report, 17152824.3-1903, 10 pages, dated Jun. 22, 2017.

* cited by examiner

Where: MTA_array is the threshold data for the uncalibrated halftone. CAL_MTA_array is the threshold data for the calibrated halftone.

The MTA data can be any size or dimensions. The range of the TF data should match the threshold levels used in the MTA file. TF data range is from zero for the first element to ($2^{bitdepth} - 1$) for the last element.

```
% reshape the TF vector into a column vector
TF_vector=reshape(TF_vector,[],1);

% find the number of elements of the TF vector
size_TF_vector=size(TF_vector,1);

% Compare (>=) each threshold value to the TF vector and sum the number of trues. This will provide the largest index
value for the TF vector which reduced by one will be the inverse TF digital count .
inverse_TF_vector= sum((repmat((0:(size_TF_vector-1)),size_TF_vector,1))>=repmat(TF_vector,1,size_TF_vector))-1;

% Transform the inverse vector by linear indexing. This maintains the
% shape of the uncalibrated threshold which creates a calibrated TA having the same size as the uncalibrated array allowing
% the input threshold data to have any size.
CAL_MTA_array=inverse_TF_vector(1+MTA_array);
```

Figure 9

HALFTONE CALIBRATION MECHANISM

FIELD OF THE INVENTION

The invention relates to the field of image reproduction, and in particular, to digital halftoning.

BACKGROUND

Halftoning is a process by which continuous tone images are approximated by a pattern of pixels that can achieve only a limited number of discrete intensities. An example of this is the rendering of gray tones with black and white pixels, such as in a newspaper photograph. A halftone pattern is made up of a region of pixels referred to as a halftone cell. In conventional digital halftoning (e.g., halftoning that uses rational tangent angles), a halftone cell includes a specific, repeatable pattern. The discrete number of tonal levels of a halftone pattern depends upon the number of pixels in the halftone cell and the number of exposure levels or dot sizes for each pixel.

Imaging systems often require some type of calibration to achieve a desired target response. Halftone calibrations typically involve converting the halftone description from a threshold basis that is most commonly used to a system that includes the halftone patterns for all gray levels. This can be visualized as a three-dimensional (3-D) lookup table (LUT) in which a calibrated version of the 3-D LUT can be created by rearranging the halftone patterns based on a transfer function LUT. This reorders the patterns of the halftone such that some patterns are replicated while others are deleted. The final calibrated 3-D LUT is then converted back into a threshold representation that is commonly used. This is a very time consuming process, especially if the array is very large (e.g., as is the case of stochastic halftones with full page width threshold arrays).

Accordingly, an improved halftone calibration mechanism is desired.

SUMMARY

In one embodiment, a printing system is disclosed. The printing system includes a halftone calibration module to receive one or more un-calibrated halftones, transform un-calibrated threshold values in the one or more un-calibrated halftones via an inverse transfer function to generate calibrated halftone threshold values and generate one or more calibrated halftones based on the calibrated halftone threshold values.

In a further embodiment, a method is disclosed including receiving one or more un-calibrated halftones, transforming un-calibrated threshold values in the one or more un-calibrated halftones via an inverse transfer function to generate calibrated halftone threshold values and generating one or more calibrated halftones based on the calibrated halftone threshold values.

BRIEF DESCRIPTION OF THE DRAWINGS

A better understanding of the present invention can be obtained from the following detailed description in conjunction with the following drawings, in which:

FIG. 9 illustrates one embodiment of code implemented to process non-single values.

DETAILED DESCRIPTION

A halftone calibration mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A portion of the disclosure of this patent document may include material that is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

Figure 1:
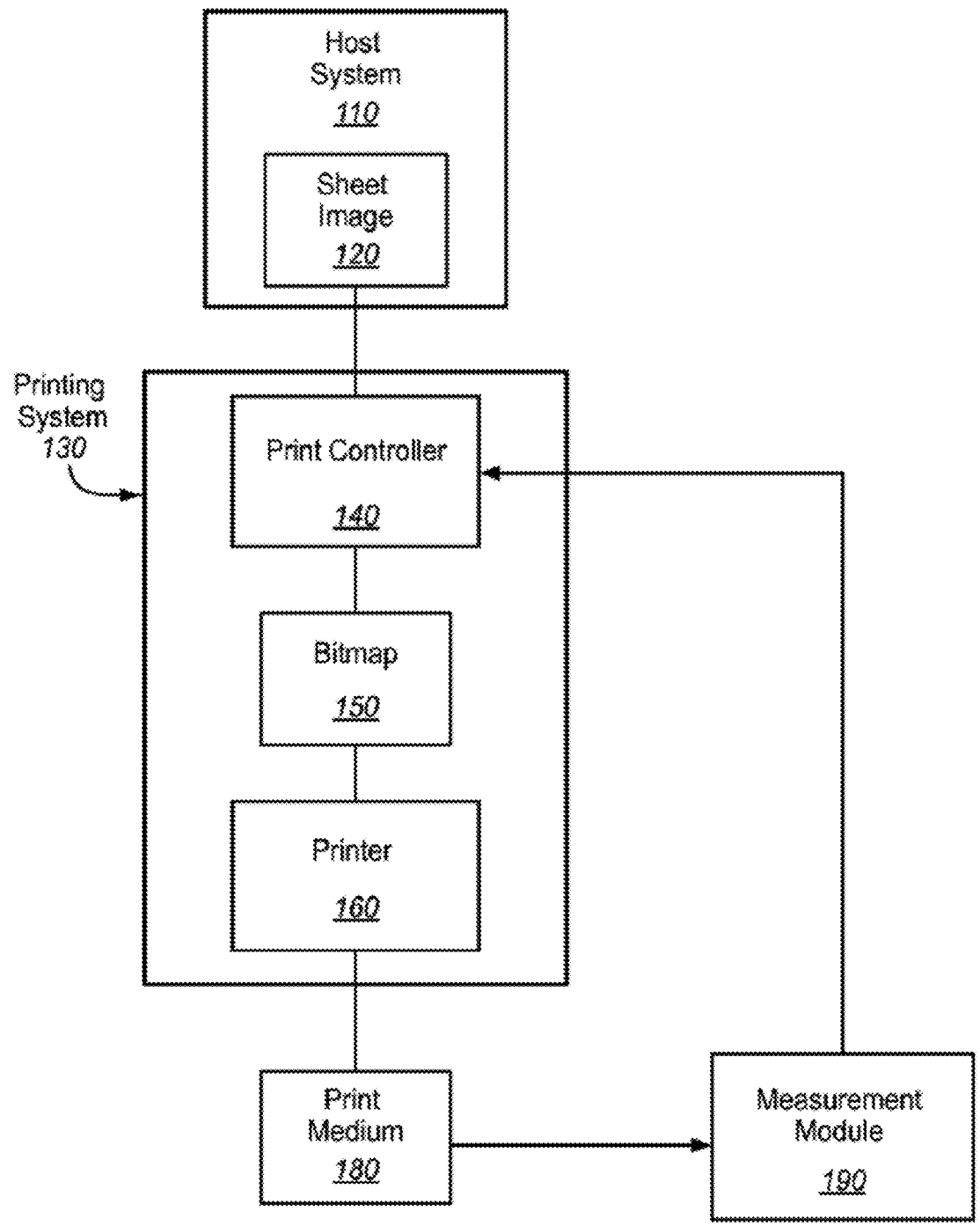
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a halftone calibration system to obtain measurements of the printed medium 180. The measured results are communicated to print controller 140 to be used in the halftone calibration process. The measurement system may be a stand-alone process or be integrated into the printing system 130.

Figure 2:
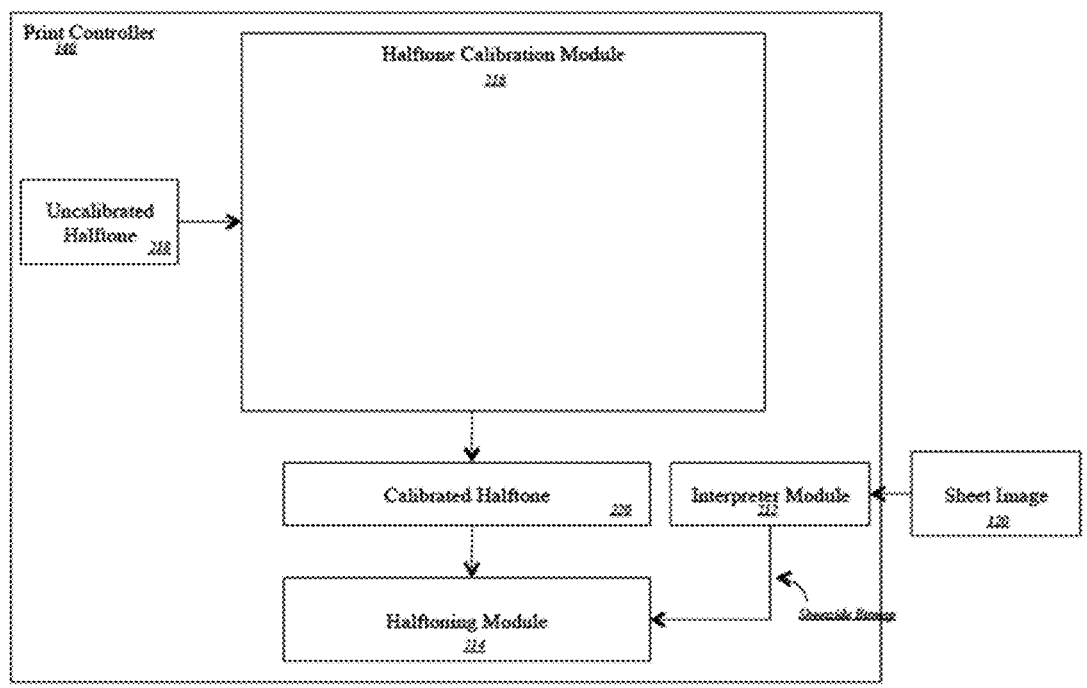
FIG. 2 is a block diagram of one embodiment of a print controller.

FIG. 2 is a block diagram illustrating an exemplary print controller 140. The print controller 140, in its generalized form, includes an interpreter module 212, a halftoning module 214, and a calibration module 216. These separate components may represent hardware used to implement the print controller 140. Alternatively or additionally, the separate components may represent logical blocks implemented by executing software instructions in a processor of the printer controller 140.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a 2-dimensional array of pixels representing an image of the print job (i.e., a Continuous Tone Image (CTI)), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of ink or toner. For example, the halftoning module 214 may convert the pixels to halftone patterns of CMYK ink or toner for application to the paper. Thus, halftoning module 214 converts a contone image to a binary/multi-bit level image at the same dots per inch (dpi). The resulting image is used to drive a printhead mechanism of the printer 160, which operates at the same dpi as the image data.

Figure 3A:
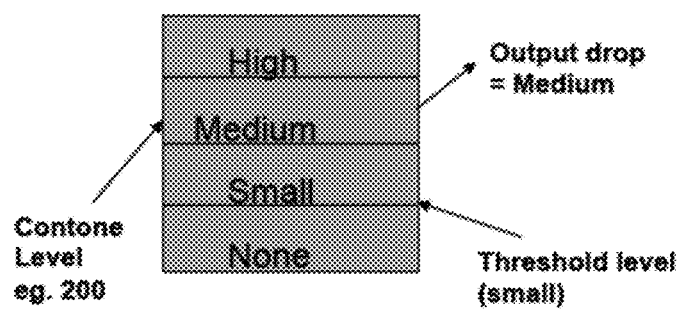
FIGS. 3A & 3B illustrate embodiments of calibrated and un-calibrated halftone output levels.

FIG. 3A illustrates one embodiment of halftone output levels. As shown in FIG. 3A, there are four possible output levels (High (or Large), Medium, Small and None). Further, each output level for a given pixel is uniquely defined based on thresholds for each drop size and the image contone level for the corresponding pixel of contone image data. Referring back to FIG. 2, halftoning module 214 transfers the converted sheetside bitmaps to the printer 160 to apply the toner to the paper. The print controller 140 may further include other modules such as a print job storage system, a raw data preprocessing system, and a bitmap processing system, etc.

Figure 3B:
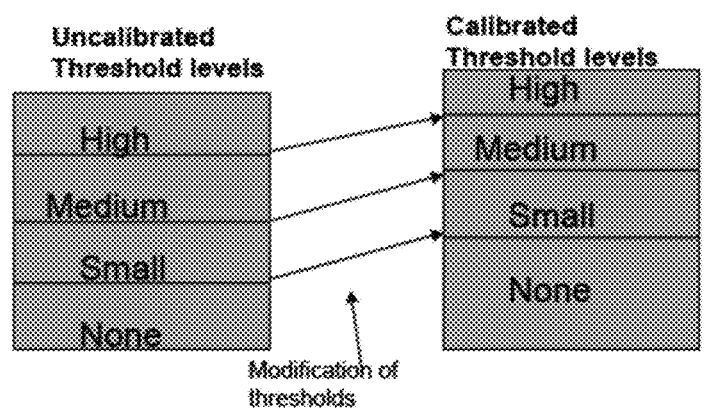

Print controller 140 also includes a halftone calibration module 216. Calibration module 216 performs a calibration process on an un-calibrated halftone 218 received at print controller 140 in order to generate a calibrated halftone 220. Calibrated halftone 220 is then received at halftoning module 214 along with the sheetside bitmap. FIG. 3B illustrates one embodiment of halftone output levels for un-calibrated and calibrated halftones. As shown in FIG. 3B, calibration involves modification of threshold levels between un-calibrated and calibrated halftones. In one embodiment, un-calibrated and calibrated halftones include threshold values for an entire array width (e.g., 256×25600×3 thresholds for a 2 bit output level system (Array height×Array width× Number of Thresholds)).

Figure 4:
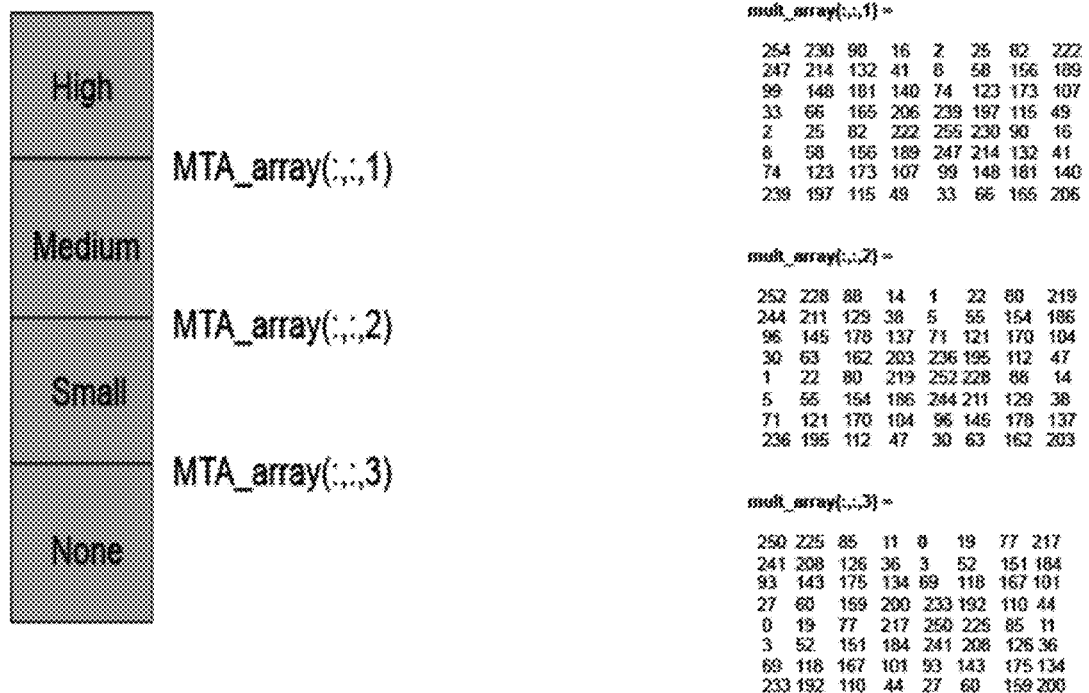
FIG. 4 illustrates one embodiment of multi-bit threshold arrays.

FIG. 4 illustrates one embodiment of multi-bit threshold arrays (MTAs). In one embodiment, the maximum value of an MTA is 254, while a minimum value is 0. MTA_array (:,:,1) provides the threshold for the Large output level, while MTA_array(:,:,2) and MTA_array(:,:,3) provide thresholds for the Medium and Small output levels respectively.

Conventional calibration mechanisms implement a transfer function to generate a calibrated halftone. A transfer function uses a one-dimensional (1D) LUT to convert an 8 bit input to an 8 bit output level. Thus, conventional calibration systems print using an identity transfer function to obtain a measured response and compute the transfer function to achieve a target response based on the measured response. An identify transfer function is a case where the output level of the LUT equals the input level. Printing using the identity transfer function is effectively printing using only the un-calibrated halftone.

Figure 5:
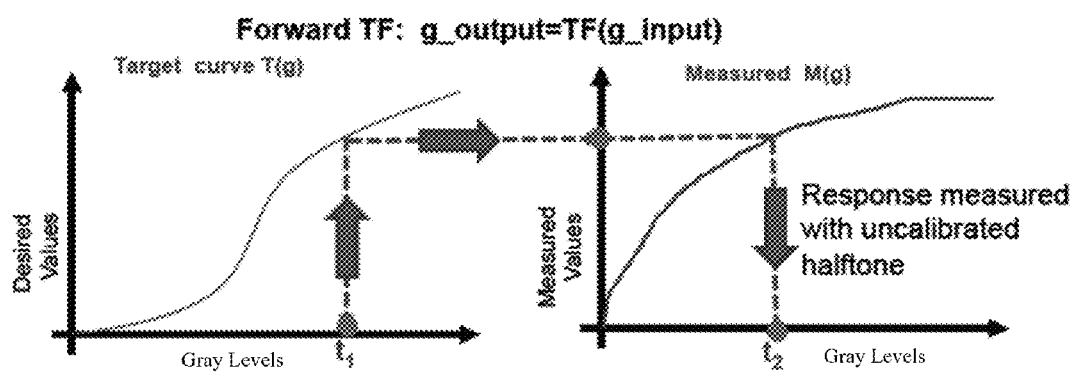
FIG. 5 illustrates one embodiment of a forward transfer function.

The target response is frequently linear and the calibration process is called "Linearizing". A 3D LUT representation of the halftone can be ordered to generate a calibrated 3D LUT that combines the effect of the transfer function and the halftone. As discussed above, implementation of a 3D LUT requires converting a halftone that usually is described by its threshold array into a 3D LUT, transforming it employing the transfer function and then converting the LUT back into a new threshold array. FIG. 5 illustrates one embodiment of a forward transfer function implemented to perform conventional calibration.

According to one embodiment, halftoning calibration module 216 generates the appropriate threshold values for the calibrated threshold array based on an un-calibrated threshold array and transfer function. Thus, halftoning module 214 generates a calibrated halftone directly from the un-calibrated halftone and the transfer function by transforming the un-calibrated threshold values to new calibrated halftone threshold values. This process is performed without having to convert to a different halftone representation (e.g. 3D LUT), calibrate and subsequently convert back to a threshold representation.

Figure 6:
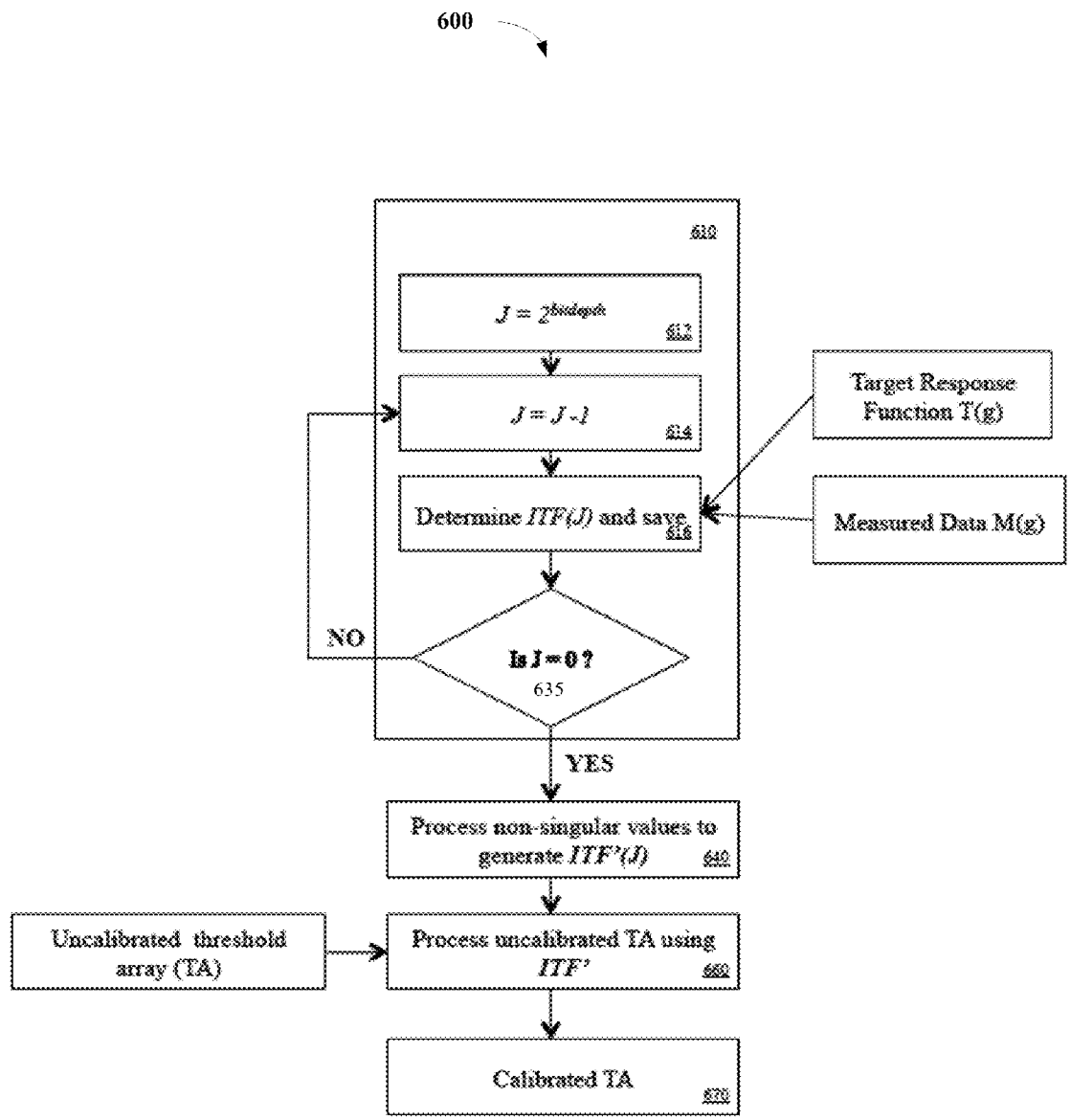
FIG. 6 is a flow diagram illustrating one embodiment of a halftone calibration process.

FIG. 6 is flow diagram illustrating one embodiment of a process 200 for halftone calibration. Process 600 may be performed by processing logic that may include hardware (e.g., circuitry, dedicated logic, programmable logic, microcode, etc.), software such as instructions run on a processing device, or a combination thereof. In one embodiment, process 600 is performed by halftoning calibration module 216.

At processing block 610, an inverse transfer function is generated. In order to produce a calibrated halftone threshold array, the inverse transfer function is computed for every gray level (J), processing block 612, in which the highest gray level achievable is defined. However only one less than the highest value is allowed. Thus at processing block 614, the new J value is calculated. Subsequently, the inverse transfer function at this J value is determined from a target response and measured response and saved, processing block 616. This operation continues until J equals zero. Thus at decision block 635, a determination is made as to whether J equals 0.

Once J equals zero, the non-singular values are processed to obtain ITF'(J), processing block 640. In one embodiment, ITF' represents the inverse transform result after non-singular value processing. In other embodiments, this process could be performed at processing block 616. At processing block 660, the un-calibrated threshold array is processed. In a further embodiment, converting the continuous function result to a discrete integer representation can be performed at this stage.

Figure 7:
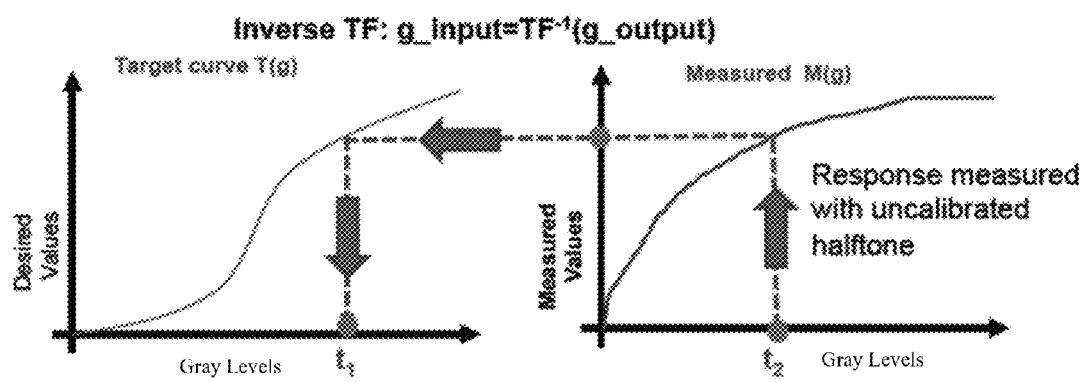
FIG. 7 illustrates one embodiment of an inverse transfer function.

At processing block 670, the calibrated threshold array is generated. FIG. 7 illustrates one embodiment of an inverse transfer function, in which a calibrated MTA "CAL_MTA_array" is derived from the un-calibrated threshold array by applying an inverse transform of the transfer function TF to each of the threshold levels of the un-calibrated MTA "MTA_array".

In one embodiment, halftoning module 214 compares the image data (I) at each pixel for the sheetside bitmap to the respective threshold data for each plane, where each plane defines thresholds for a particular drop size (e.g., Planes 1, 2, and 3 represent the thresholds for the drop size determination). To obtain threshold values for the entire sheetside bitmap the threshold array is tiled to at least cover the entire bitmap. In one embodiment, the multi-bit halftoning relationship is represented as Large drop: I>MTA_array(:,:,1); Medium drop: I>MTA_array(:,:,2) & I<=MTA_array(:,:,1); Small drop: I>MTA_array(:,:,3) & I<=MTA_array(:,:,2); and None: I<=MTA_array(:,:,3).

Assuming calibration using the transfer function in the image path followed by halftoning with an un-calibrated halftone, the halftoned image is to be identical to the result using halftoning employing a calibrated halftone without a transfer function operation. The image data I is transformed using the calibration transfer function.

Figure 8:
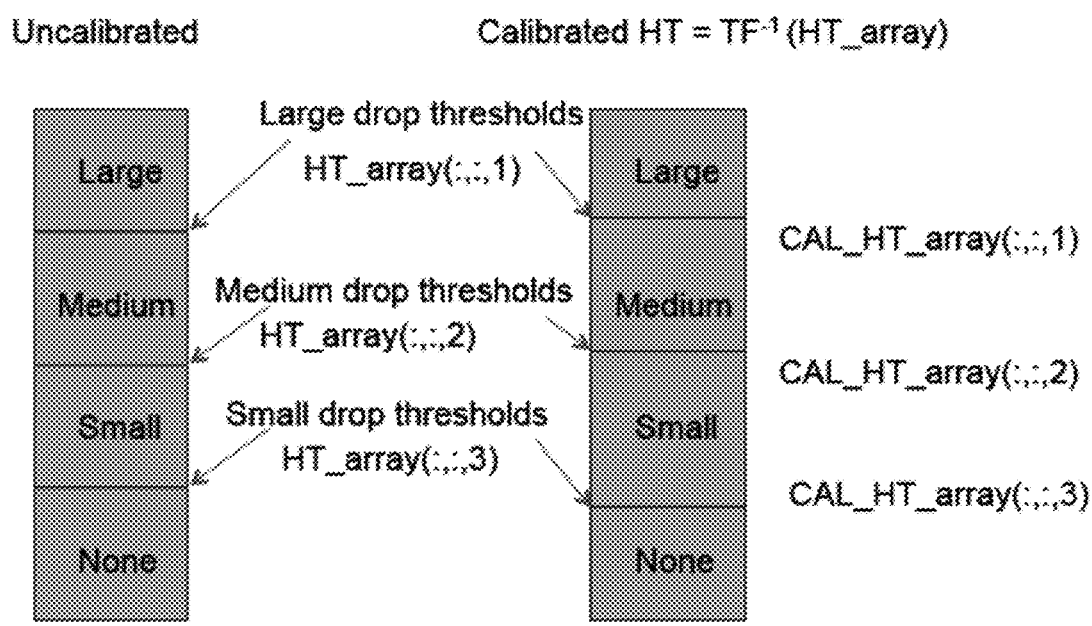
FIG. 8 illustrates one embodiment of un-calibrated and calibrated multi-bit halftone output levels.

As discussed above with reference to processing block 660, calibrated thresholds (CAL_MTA_array) are calculated. The calculations result in the final set of Calibrated MTA threshold values: CAL_MTA_array(:,:,1)=$TF^{-1}$(MTA_array(:,:,1)); CAL_MTA_array(:,:,2)=$TF^{-1}$(MTA_array(:,:,2); and CAL_MTA_array(:,:,3)=$TF^{-1}$(MTA_array(:,:,3)). Therefore, generalizing for any set of threshold data having any number of drop sizes or planes results in CAL_MTA_array=$TF^{-1}$(MTA_array). In one embodiment, for a Large drop, I>$TF^{-1}$(MTA_array(:,:,1)). Similarly, for Medium, Small and None thresholds I>$TF^{-1}$(MTA_array(:,:,2)) & I<=$TF^{-1}$(MTA_array(:,:,1)); I>$TF^{-1}$(MTA_array(:,:,3)) & I<=$TF^{-1}$(MTA_array(:,:,2)); and None: I<=$TF^{-1}$(MTA_array(:,:,3)), respectively. FIG. 8 illustrates one embodiment of a mapping between calibrated and un-calibrated multi-bit halftone output levels using the inverse transfer function.

Transforming threshold array values using an inverse of the transfer function may result in calibration with fewer gray levels because inverse transfer functions are not single valued functions. This reduced number of gray levels occurs where "flat spots" in the function exist, having the same output value for multiple input values. As discussed above with reference to processing block 640, non-single values are processed to produce the same results as the LUT halftone calibration method. This would be the case where it is desired to match the results of the LUT halftone calibration method, which is not always a requirement. FIG. 9 illustrates one embodiment of code implemented to process the inverse transfer function, including the case of non-single values from a forward transfer function discrete vector. The functions in FIG. 9 assume a Matlab language. TF_vector is the transfer function LUT generated from the process depicted in FIG. 5 for each gray level. In this approach, which is different than that depicted in FIG. 6, the discrete inverse transfer function LUT with modifications for single valued case (inverse_TF_vector) is computed from the forward transfer function and not the from a modification to the inverse transfer function.

In conventional calibration mechanisms, a calibrated halftone must be generated to understand the number of gray levels resulting from calibration. However, the above-described inverse transfer function mechanism provides a framework to understand the number of levels without generating a calibrated halftone. The inverse transfer function mechanism also provides insight into the number of gray levels after calibration. Limitations to the number of gray levels after calibration may occur due to limited gray levels in the un-calibrated halftone or the transfer function. Therefore the inverse transfer function reduces the number of levels. An exception to this is the case where the transfer function and the inverse transfer function, is the identity function. For the case where the transfer function and inverse is identity the number of gray levels is not reduced.

Calibration may also be employed to correct for non-uniformities in the direction along the array width. In this case compensation can correct for variations in the printing performance between each nozzle of an array system, so as to produce consistent printing from each nozzle to a target response. In this case transfer functions are generated for each nozzle, which corresponds to a column and multiple planes of threshold data. The inverse transfer function for each nozzle is computed, based on the transfer function and target as previously described. The inverse transfer function is used to modify threshold values for all planes for each column of the threshold array, thus creating a uniformity compensated array width size threshold array. Where each column corresponds to a specific nozzle and planes correspond to thresholds for different drop sizes. The inverse transfer function method is very efficient at computing a calibrated threshold array, since a transfer function exists for each column of data. One can appreciate that an array having 25600 columns and three planes would benefit from this improved method of deriving a uniformity calibrated halftone threshold array.

Further, the number of gray levels in the un-calibrated TA provide an upper limit for the number of calibrated levels. Using the variables described by the algorithm in FIG. 9, the following can be defined: number of gray levels in the un-calibrated screen=unique(MTA_array); number of levels in the transfer function=unique(TF_vector); number of levels available after calibration=unique(inverse_TF_vector) =unique($TF^{-1}$ (MTA_array)); and number of levels available after calibration<=min(unique(MTA_array), unique (TF_vector)).

Figure 10:
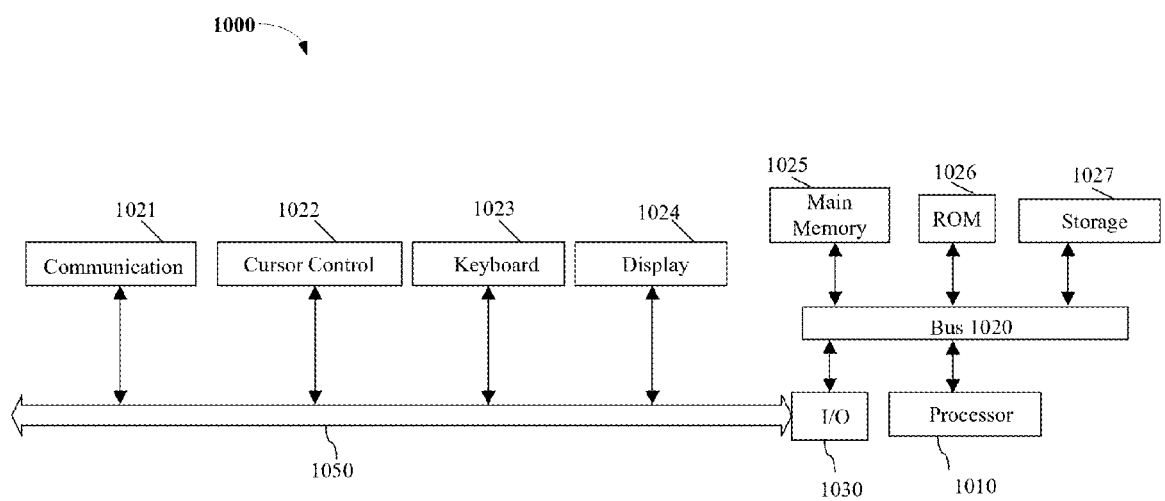
FIG. 10 illustrates one embodiment of a computer system.

FIG. 10 illustrates a computer system 1000 on which printing system 130 and/or halftone calibration module 216 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1025 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. An article of manufacture comprising a non-transitory machine-readable medium including data that, when accessed by a machine, cause the machine to:
   generate an inverse transfer function for each of a plurality of gray levels based on a target response and a measured response;
   receive one or more un-calibrated halftones;
   transform un-calibrated threshold values in the one or more un-calibrated halftones via the inverse transfer function to generate calibrated halftone threshold values;
   generate one or more calibrated halftones based on the calibrated halftone threshold values;
   process image data using the one or more calibrated halftones; and
   transmit the processed image data for printing.

2. The article of manufacture of claim 1, wherein generating the inverse transfer function comprises:
   defining a highest achievable gray level;
   calculating a value a magnitude less than the highest gray level; and
   determining the inverse transfer function from the target response and the measured response.

3. The article of manufacture of claim 2, comprising a machine-readable medium including data that, when accessed by a machine, further cause the machine to process one or more un-calibrated threshold arrays including the un-calibrated threshold values using the inverse transfer function to generate one or more calibrated threshold arrays having the calibrated halftone values.

4. The article of manufacture of claim 3, comprising a machine-readable medium including data that, when accessed by a machine, further cause the machine to compare image data to values in the one or more calibrated threshold arrays for each of one or more planes.

5. The article of manufacture of claim 4, wherein each of the one or more planes define thresholds for a drop size.

6. The article of manufacture of claim 5, wherein the one or more planes comprise at least one of a Large drop size, Medium drop size, Small drop size and None.

7. The article of manufacture of claim 6, comprising a machine-readable medium including data that, when accessed by a machine, further cause the machine to process non-single values in the one or more calibrated threshold arrays.

8. The article of manufacture of claim 3, wherein the one or more un-calibrated threshold arrays and the one or more calibrated threshold arrays comprise multi-bit threshold arrays.

9. The article of manufacture of claim 1, wherein the inverse transfer function is derived from a corresponding transfer function.

10. The article of manufacture of claim 1, comprising a machine-readable medium including data that, when accessed by a machine, further cause the machine to print the processed image data.

11. A printing system comprising:
    a controller operable to generate an inverse transfer function for each of a plurality of gray levels based on a target response and a measured response, receive one or more un-calibrated halftones, transform un-calibrated threshold values in the one or more un-calibrated halftones via an inverse transfer function to generate calibrated halftone threshold values, generate one or more calibrated halftones based on the calibrated halftone threshold values, process image data using the one or more calibrated halftones and transmit the processed image data for printing.

12. The printing system of claim 11 wherein generating the inverse transfer function comprises defining a highest achievable gray level, calculating a value a magnitude less than the highest gray level and determining the inverse transfer function from a target response and a measured response.

13. The printing system of claim 12 wherein the controller is operable to process one or more un-calibrated threshold arrays including the un-calibrated threshold values using the inverse transfer function to generate one or more calibrated threshold arrays having the calibrated halftone values.

14. The printing system of claim 13 wherein the controller is operable to compare image data to values in the one or more calibrated threshold arrays for each of one or more planes.

15. The printing system of claim 14 wherein each of the one or more planes define thresholds for a drop size.

16. The printing system of claim 15 wherein the one or more planes comprise at least one of a Large drop size, Medium drop size, Small drop size and None.

17. The printing system of claim 16 wherein the controller is operable to process non-single values in the one or more calibrated threshold arrays.

18. The printing system of claim 13 wherein the one or more un-calibrated threshold arrays and the one or more calibrated threshold arrays comprise multi-bit threshold arrays.

19. The printing system of claim 11 wherein the inverse transfer function is derived from a corresponding transfer function.

20. The printing system of claim 11, further comprising a printer to print the processed image data.

* * * * *